United States Patent [19]
Jarrell

[11] Patent Number: 6,129,033
[45] Date of Patent: Oct. 10, 2000

[54] PULLEY- OR ROLLER-TYPE BLOCK WITH LOCK ARRANGEMENT

[76] Inventor: John L. Jarrell, 4262 D Hwy., Bolivar, Mo. 65613

[21] Appl. No.: 09/253,653

[22] Filed: Feb. 20, 1999

Related U.S. Application Data

[60] Provisional application No. 60/075,654, Feb. 23, 1998.

[51] Int. Cl.$^7$ .................................................. B63H 9/10
[52] U.S. Cl. ........................... 114/90; 114/199; 182/193; 188/65.1
[58] Field of Search .................. 114/199, 90; 188/65.1, 188/65.5; 182/193

[56] References Cited

U.S. PATENT DOCUMENTS

| | | | |
|---|---|---|---|
| D. 306,134 | 2/1990 | Harken et al. | D8/360 |
| 4,077,347 | 3/1978 | Arce | 114/108 |
| 4,097,023 | 6/1978 | Muller | 254/156 |
| 4,386,760 | 6/1983 | Hutton | 254/371 |
| 4,533,026 | 8/1985 | Bernard | 188/184 |
| 5,054,577 | 10/1991 | Petzl et al. | 182/5 |
| 5,096,022 | 3/1992 | Bowers | 188/65.1 |
| 5,360,083 | 11/1994 | Hede | 182/5 |
| 5,577,576 | 11/1996 | Petzl et al. | 188/65.4 |

*Primary Examiner*—Jesus D. Sotelo
*Attorney, Agent, or Firm*—Jonathan A. Bay

[57] ABSTRACT

A pulley- or roller-type block is provided with a lock arrangement. The block has a casing and a rolling unit mounted in the casing for clockwise and counterclockwise rolling. The rolling unit has a circumferential ring portion including a line-bearing surface whereby. In use the line is allowed to transit partially around the rolling unit as the rolling unit passively rolls clockwise or counterclockwise in response to alternate-direction transit of the line. The lock arrangement has a line-contacting portion operative between locking and unlocked extreme positions, and an operator for operating the strand-contacting portion. Wherein, because of the risk of forming a permanent weak spot in the line under highly concentrated locking contact, either • the circumferential ring portion of the rolling unit, including the strand-bearing surface thereof, or • the strand-contacting portion of the locking arrangement is formed from the following:—ie., it is formed from a resilient material so that the compressive force on the strand (as squeezed between the rolling unit and the lock arrangement) is distributed over a wider contact area by flexion of the resilient material. This is done so for the dual purposes of both eliminating formation of weak spots in the line as well as for enhancing frictional grabbing of the line to eliminate slip of the locked line.

24 Claims, 5 Drawing Sheets

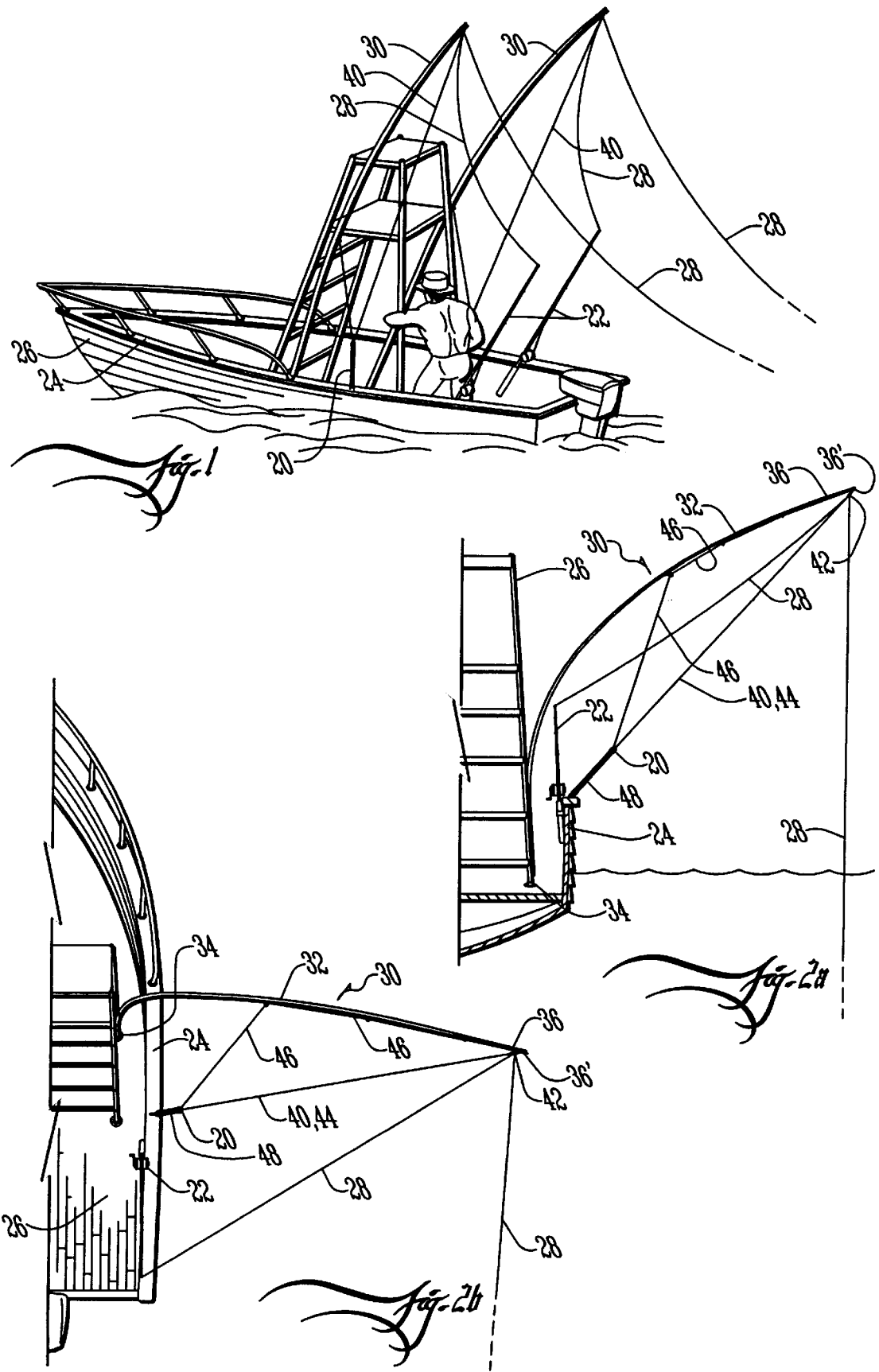

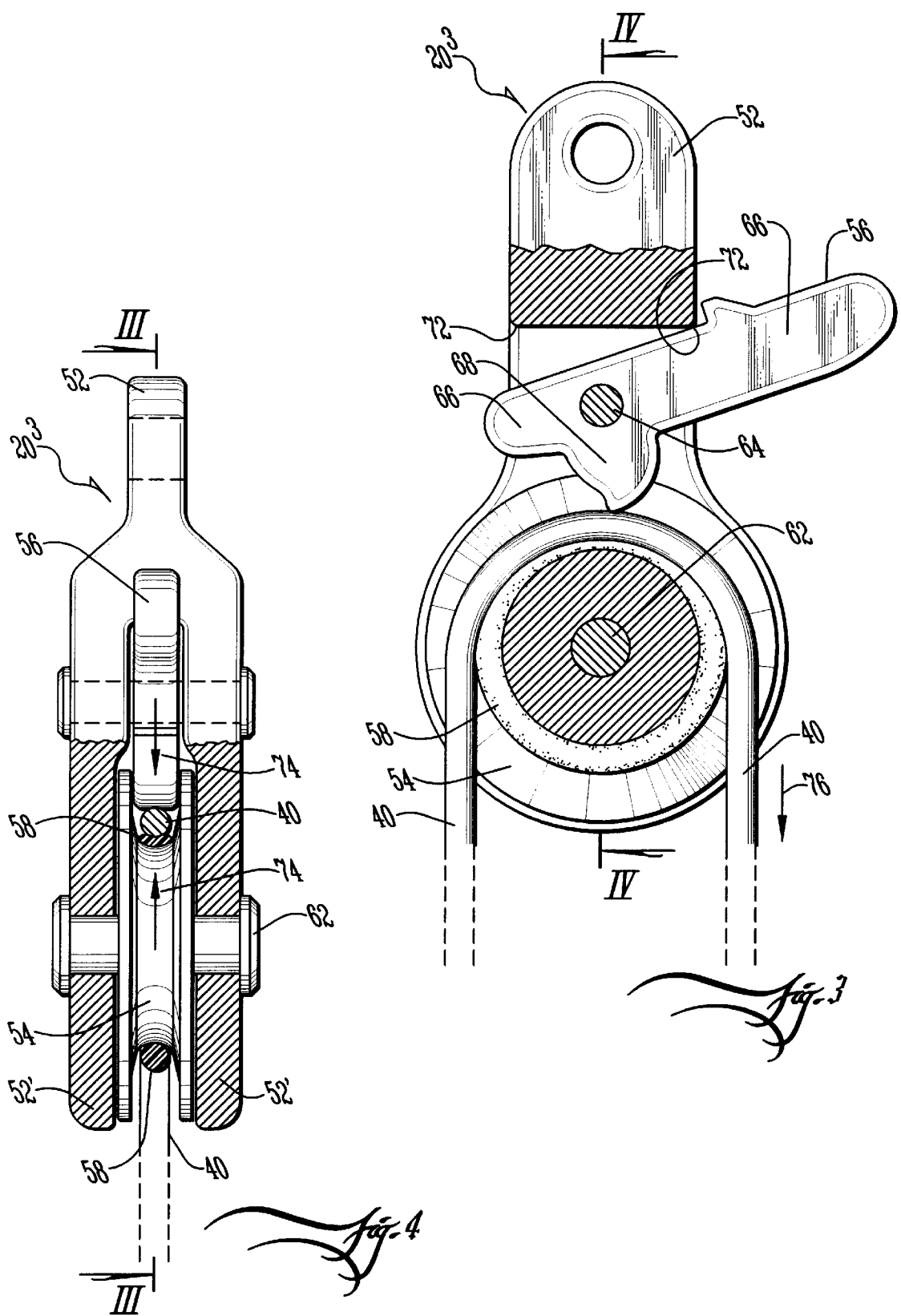

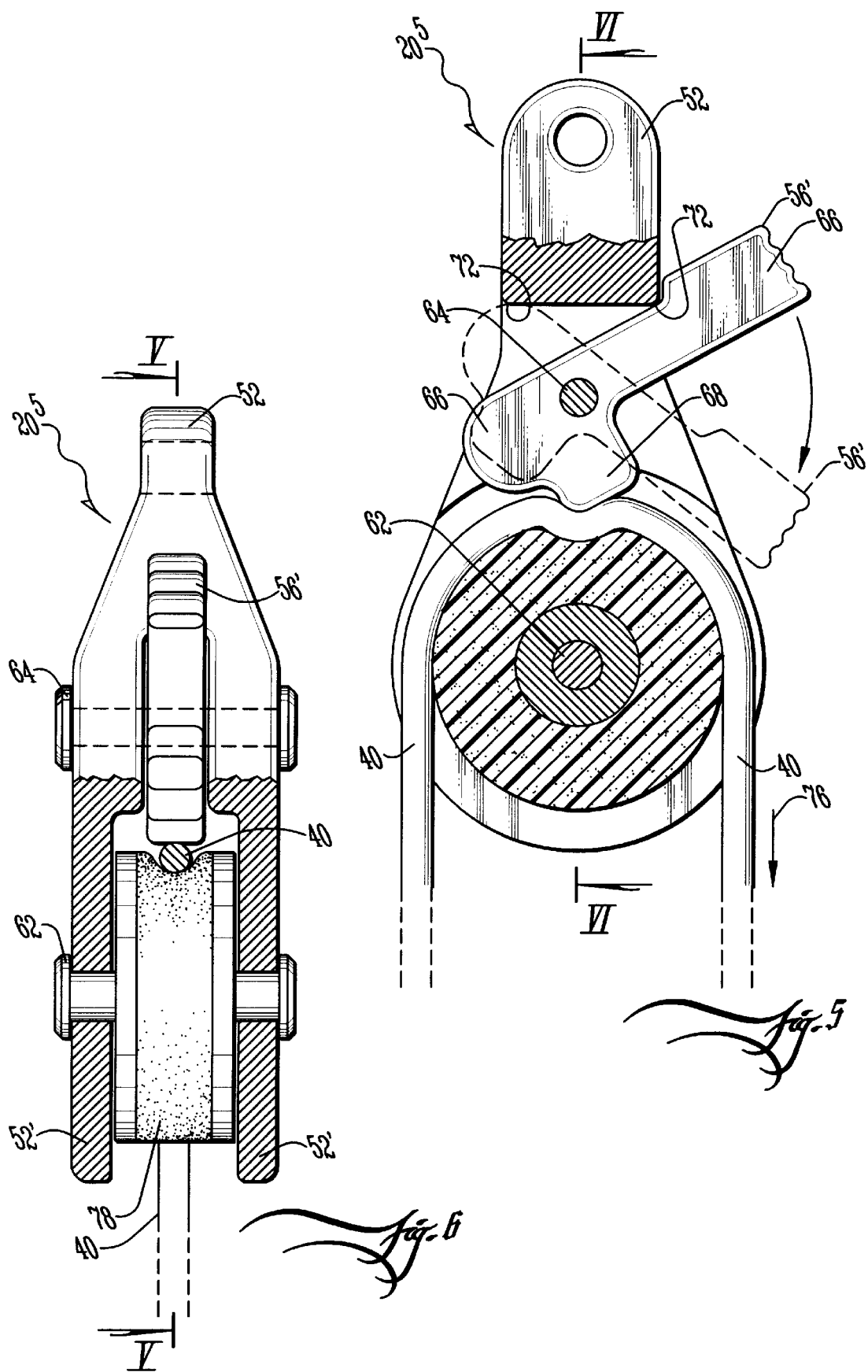

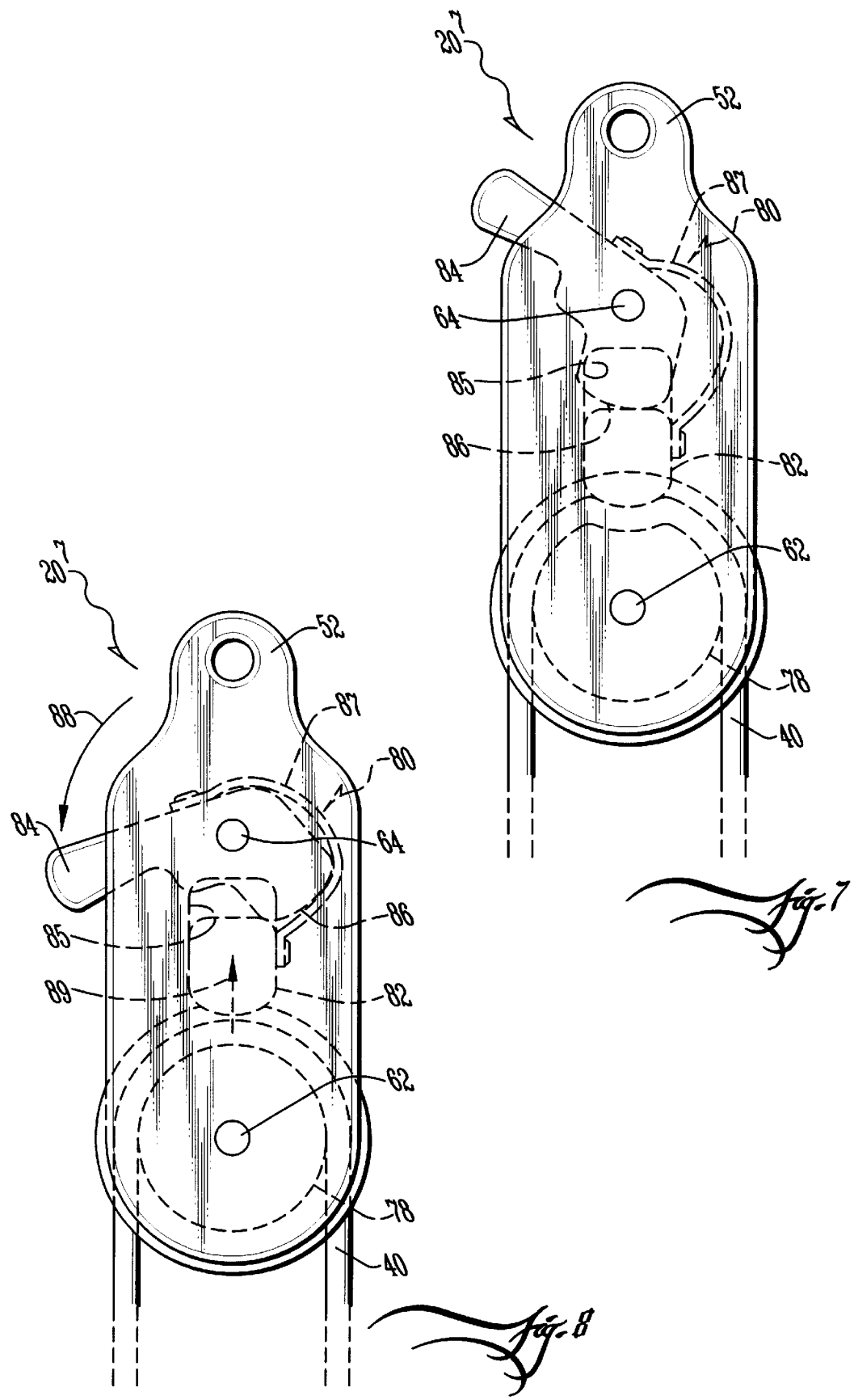

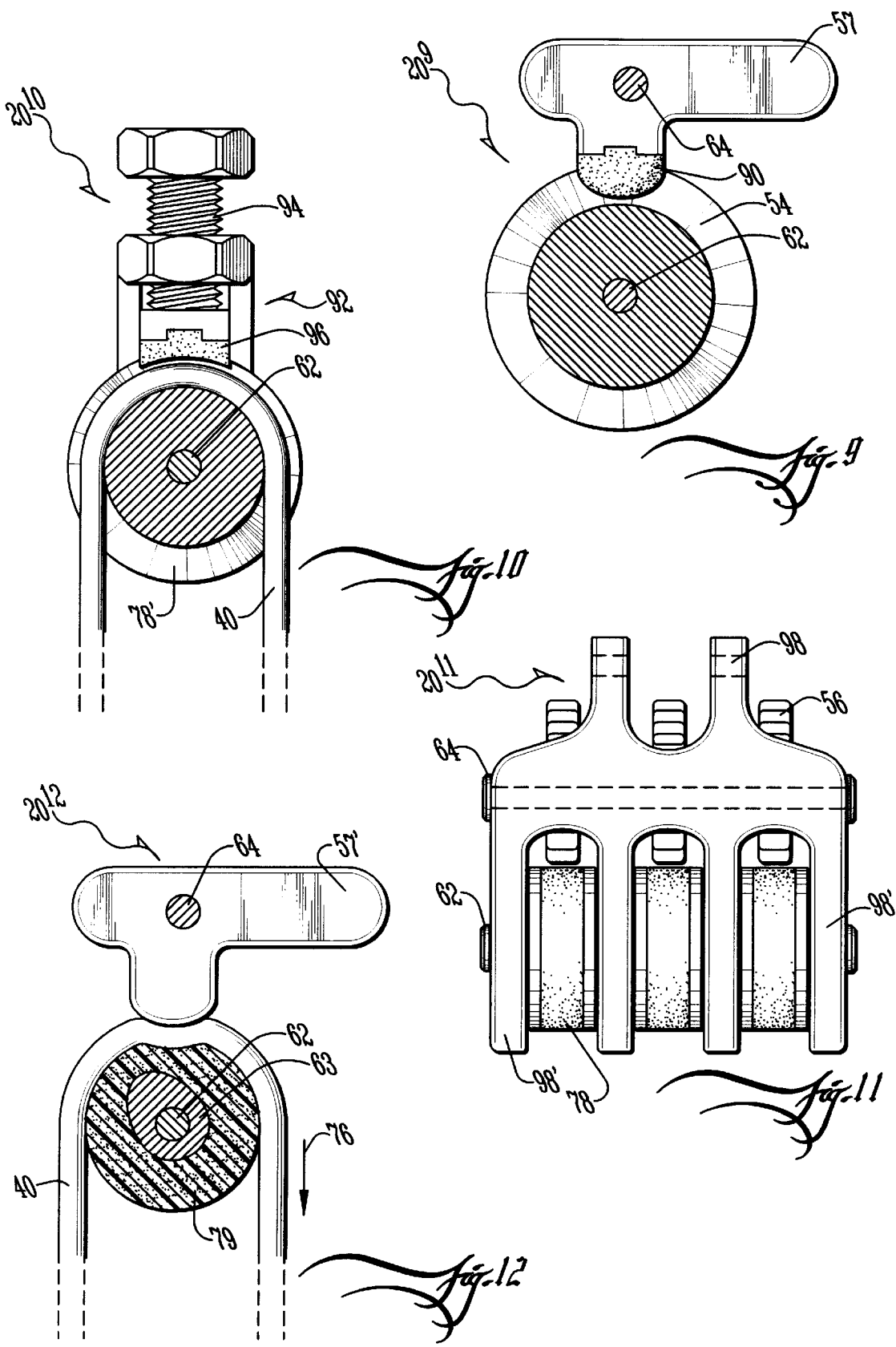

PULLEY-OR ROLLER-TYPE BLOCK WITH LOCK ARRANGEMENT

CROSS-REFERENCE TO PROVISIONAL APPLICATION(S)

This application claims the benefit of U.S. Provisional Application No. 60/075,654, filed Feb. 23, 1998.

BACKGROUND OF THE INVENTION

The invention relates to pulley- or roller-type blocks for lines, strands, cables, wires, ropes, cords or the like, and more particularly to a pulley- or roller-type block having a lock arrangement to lock or hold fast the given line, strand, cable, wire, rope, cord or whatever.

Whereas in this description the inventive block hereof is occasionally referred to as a "pulley- or roller-type" block, this reference terminology is used merely for convenience in this description to exemplify at least two members of a larger class of rolling stock which the inventive block can support for hoisting applications with a load attached to the given line, strand, cable, wire, rope, cord and so on. Hence the depiction in the drawings here of pulleys and/or rollers are included for illustrative purposes and accordingly do not limit the configuration of the inventive block to pulley- and/or roller-configurations only. Also, the given line or whatever can be chosen without limitation from a group given any of the following:—eg., braided or monofilament line, or even coaxial-filament line including what down through the years has become known to anglers as "co-filament."

Additional aspects and objects of the invention will be apparent in connection with the discussion further below of preferred embodiments and examples.

SUMMARY OF THE INVENTION

It is an object of the invention to provide a pulley- or roller-type block with a line-locking or -clamping arrangement.

It is an additional object of the invention to arrange the above line-locking or -clamping arrangement such that the compressive contact forces on the line are spread out so as eliminate the risk of forming a permanent weak spot in the line under what otherwise might be highly concentrated squeezing force.

It is an alternate object of the invention to incorporate such a pulley- or roller-type block with a line-locking or -clamping arrangement in a sport angler's outrigger system.

These and other aspects and objects are provided according to the invention in a pulley- or roller-type block is provided with an inventive lock arrangement. The block has a casing and a rolling unit mounted in the casing for clockwise and counterclockwise rolling. The rolling unit has a circumferential ring portion including a line-bearing surface whereby. In use the line is allowed to transit partially around the rolling unit as the rolling unit passively rolls clockwise or counterclockwise in response to alternate-direction transit of the line. The lock arrangement has a line-contacting portion operative between locking and unlocked extreme positions, and an operator for operating the strand-contacting portion. Wherein, because of the risk of forming a permanent weak spot in the line under highly concentrated locking contact, either • the circumferential ring portion of the rolling unit, including the strand-bearing surface thereof, or • the strand-contacting portion of the locking arrangement is formed from the following:—ie., it is formed from a resilient material so that the compressive force on the strand (as squeezed between the rolling unit and the lock arrangement) is distributed over a wider contact area by flexion of the resilient material. This is done so for the dual purposes of both eliminating formation of weak spots in the line as well as for enhancing frictional grabbing of the line to eliminate slip of the locked line.

Additional aspects relate to the various ways the above-described resilient material can be incorporated in the invention. One way is, that the rolling unit and its circumferential ring portion can be configures as a rigid roller and an elastomeric band stretched around the circumferential surface of the rigid roller. Another way is to make the rolling unit and its circumferential ring portion out of a rigid pulley and an elastomeric O-ring stretched around and nested in the pulley race. An alternate way is to produce the rolling unit and its circumferential ring portion as single elastomeric roller. Also, the rolling unit and its circumferential ring portion can comprise a composite of at least an eccentric rigid core and an elastomeric cover around the rigid core, which elastomeric cover when un-flexed generally defines a non-eccentric line-bearing surface. Another different way would include producing the line-contacting portion of the clamping mechanism in the format of a resilient brake pad.

Such a pulley- or roller-type block that has such an inventive locking or clamping clamp arrangement is suitable for use on such diverse lines as any one of strands, cables, wires, ropes, cords, monofilament lines, braided lines, coaxial-filament lines and so on.

The clamping arrangement can be arranged such that the line-contacting portion thereof reciprocates into and away from the rolling unit for moving between the clamping and released extreme positions thereof, respectively. Alternatively, the clamping arrangement can be arranged such that the line-contacting portion is formed at the end of an over-center jam which is mounted for pivotally moving the line-contacting portion between the clamping and released extreme positions thereof, respectively. In such a case, preferably the over-center jam is biased away from the clamping position so that the line-contacting portion will provide clearance for line transit during non-use of the clamping arrangement.

As previously mentioned, one preferred operative use environment for the invention is for use in an angler's outrigger arrangement. Outriggers are common on sport-fishing boats and are useful for among other things spreading apart several trolling lines. Typically an outrigger like this has a spar extending from a base to a tip. The base is mounted to the boat. A fishline release clip is provided for shuttling reversibly between a near and far position. The far position generally corresponds somewhere proximate the spar tip. The near position is more generally situated where it allows a passenger of the boat to reach out and up and manipulate or reload the release clip.

Also typical is the use of heavy monofilament line for carrying and conveying the release clip back and forth between the near and far positions for it. To do this, an idler pulley or roller is usually attached to the spar at about the tip. The monofilament line is typically extended in a circuit between the idler on the spar tip and the inventive a pulley- or roller-type block with a lock arrangement, which is secured more generally within reach of a passenger in the passenger areas of the boat. Hence, operating the locking arrangement of the pulley- or roller-type block allows locking the position of the line release in any position between the near and far extreme positions.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a pulley- or roller-type block having a lock arrangement in accordance with the invention, as shown in use in the rigging of outriggers by a saltwater angler in a sportboat for trolling to illustrate one example operative use environment for the pulley- or roller-type block and lock arrangement in accordance with the invention;

FIG. 2a is an elevational section view of FIG. 1, as taken through a vertical plane, and with the port half of the sportboat broken away;

FIG. 2b is a top plan view of FIG. 1, except that as was comparably done in FIG. 2a, the port half of the sportboat is broken away;

FIG. 3 is an enlarged partial sectional view of the pulley- or roller-type block of FIGS. 1 through 2b, except as shown in isolation, and as taken along line III—III in FIG. 4;

FIG. 4 is a partial sectional view as taken generally along the line indicated by arrows IV—IV in FIG. 3;

FIG. 5 is a partial sectional view of an alternate version of a pulley- or roller-type block having a lock arrangement in accordance with the invention; and as taken generally along the line indicated by arrows V—V in FIG. 6;

FIG. 6 is a partial sectional view, as taken generally along line VI—VI in FIG. 5;

FIGS. 7 and 8 are a set of partial sectional views comparable to FIG. 5, except showing an additional version of a pulley- or roller-type block having a lock arrangement in accordance with the invention, wherein FIG. 7 shows the lock arrangement in a locked position and FIG. 8 shows the lock arrangement in an unlocked position;

FIG. 9 is a partial sectional view comparable to FIG. 5 except showing a further embodiment of the lever and roller thereof;

FIG. 10 is a partial sectional view comparable to FIG. 7 except showing a further embodiment of the slide and roller thereof;

FIG. 11 is an elevational view of another version of a block in accordance with the invention, as configured with multiple rollers and associated locking arrangements; and, FIG. 12 is a partial sectional view comparable to FIG. 9 except showing another embodiment of the lever and roller thereof.

DETAILED DESCRIPTION OF THE PREFERRED EMBODIMENTS

FIG. 1 shows a saltwater angler trolling dual bait-and-tackle arrangements 22 behind opposite side beams 24 of a sportboat 26, wherein the fishing line 28 of each bait-and-tackle arrangement 22 is threaded through a corresponding outrigger 30 that flares away outboard from the respective side beams 24 of the sportboat 26. An inventive aspect of these dual outriggers 30 is, that each outrigger 30 includes a pulley- or roller-type block and lock arrangement 20 in accordance with the invention.

The foregoing scene of saltwater trolling and outriggers 30 merely illustrates one example operative use environment for the invention 20. Hence the depiction here of outriggers 30 and angling (saltwater or otherwise) is included merely for convenience in this description for illustrative purposes only to show one example use of the invention 20, and accordingly the example here of outriggers 30 does not exclude any possible other uses of the invention 20, including whether it be something to do with the outrigger environment or not, or even whether it has anything to do with an angling- or a sporting-use whatsoever.

As shown by FIGS. 2a and 2b, an outrigger 30 comprises a spar 32 extending between a base 34 anchored to the boat hull 26 and a tip 36 that carries an eyelet or an idler bearing-block 36' (not depicted in any close detail, but see, e.g., U.S. Des. Pat. 306,134—Harken et al.) or the like. The rigging of the outrigger 30 comprises a strand 40 that extends around in a triangular circuit such that its opposite tag ends are tied to opposite sides of release clip 42 or the like (not depicted in any close detail, but refer to, e.g., the release clip products of Rupp Marine, Inc., Port Salerno, Fla. which market under the brand name ZIP CLIPS™). Such hardware as the eyelet/bearing block 36' and/or the release clip 42 are conventional. In use, the release clip 42 allows fishing line 28 to be threaded through the clip 42, the clip 42 working to hold the fishing line against ordinary trolling drag, but a sufficient pull from the baited hook-end of the fishing line 28 yanks the line 28 free of the clip 42 in order to allow the angler to play the fish. As previously mentioned, the foregoing is known and conventional.

With more particular reference to the strand 40, it extends along a generally triangular circuit, and as extended as such, it includes an elongated span 44 extending between the spar tip 36 and the inventive block 20 in accordance with the invention, as well as return spans 46 to complete the triangle. The release clip 42 is situated in the elongate span 44 between the spar tip 36 and inventive block 20. The inventive block 20 is tethered to the boat side beam 24 by an elastic shock- or bungee-cord 48, which applies and maintains tension to the triangular circuit 44 and 46 of the strand 40.

Given the foregoing, the angler can shuttle the release clip 42 back and forth between the spar tip 36 and boat side beam 24—to run it out to the spar tip 36 and fetch it back as desired—by hand-lining the strand 40. One of the preferred functions of the outrigger 30 includes that it should—somehow—lock the strand 40 to hold the release clip 42 fast in a desired position(s), most often at the spar tip 36.

If, for instance, the strand 40 is not locked securely, the drag of the bait trolling in the water tends to creep the release clip 42 down from the spar tip 36, back to the side beam 24, which of course defeats the purpose of the outrigger 30. However, there are problems when it comes to locking or clamping the strand 40 because conventionally the strand 40 is such a material as 300-pound test monofilament or the like (wherein, 300-pound test is equivalent to about 135-Kg test), which might have a diameters commonly in the range between $^{80}/_{1000}{}^{ths}$-inch and $^{95}/_{1000}{}^{ths}$-inch (2 mm and 2.5 mm). Monofilament that stout—of which the 300-pound test variety is merely representative—is a stiff, hard material. By all practical measure, 300-pound test monofilament is virtually incompressible. Also, the surface finish of such stiff hard monofilament is smooth and, by nature, it is a slick finish. Trials show that smooth metallic clamping surfaces are not practicably able to grip such slick monofilament except in cases of severe clamping pressures, so severe in fact that the clamping pressures actually crush, flatten, or simply sever the monofilament. To fix this problem by giving the metallic clamping surfaces some roughness or teeth for bite, is a poor solution because the teeth will undesirably scuff and damage the monofilament, which all the same is intolerable damage to the monofilament as it will ultimately devolve likewise to premature failure of the monofilament.

It is therefore an object of the invention to provide a pulley- or roller-type block 20 which includes an effective locking or clamping arrangement suitable for use on a virtually incompressible strand, including such a strand 40 which might also have a relatively slick finish. Such a strand includes without limitation stout monofilament including by way of non-limiting example 300-pound test monofilament. These and additional aspects and objects of the invention will be apparent in connection with the discussion that follows with reference to FIGS. 3 and 4 and the successive figures that follow.

FIG. 3 shows one version of a block $20^3$ in accordance with the invention comprising a casing 52, a pulley 54, a locking lever 56, and a soft O-ring 58 encircling the pulley 54 and nested in the race thereof. The casing 52 has a forked-shape in which the pulley 54 is carried on a main pivot pin 62 between a pair of fingers 52' (see FIG. 4) and allowed to turn in both the clockwise and counterclockwise directions. The lever 56 has a "T-shape" and is mounted on a pin 64 for pivoting between an extreme unlocked position (a comparable unlocked position shown FIG. 5, in dashed lines) and a locked position (and again, a comparable locked position shown in FIG. 5 in solid lines). The opposite halves of the head 66 of the T-shaped lever 56 are stopped in the extreme unlocked and locked positions, respectively, by respective stop surfaces 72 on the casing 52 shaped and arranged for this purpose. In the locked position, the stem 68 of the T-shaped lever 56—or "jam" 68"—is configured for an over-center relationship with its pivot axis 64 and the main pivot pin 62 of the pulley 54. In the extreme unlocked position, both the stem (or jam) 68 and the head 66 of the T-shaped lever 56 give clearance to the strand 40 to avoid contacting it as it runs around the pulley 54.

Preferably a light spring (not shown in FIGS. 3 or 4) is included to bias the lever 56 to rest in the extreme unlocked position (the unlocked position is not shown in either in FIGS. 3 or 4, and again, a spring is likewise not shown in these views). Without a spring, the stem or jam 68 of the lever 56 is given a cam-shape in the area where it contacts the strand 40. This smooth cam-shape helps preventing the unlocked lever 56, while freely flapping about, from errantly biting into the strand 40 as it runs off the pulley 54 in direction 76, and self-latching itself in the locked position. Accordingly, the block and lock arrangement $20^3$ in accordance with the invention should only lock when a user intentionally puts it there. As shown by FIG. 3, the locked lever 56 locks the strand 40 from running off the pulley 54 in the clockwise direction.

An inventive aspect of the block 203 as arranged in FIGS. 3 and 4 is the soft O-ring 58 surrounding the pulley 54. Whereas the casing 52, pulley 54, and lever 56 are each preferably formed from corrosion resistant materials including without limitation brass, stainless steel or aluminum and so on;—the O-ring 58 is preferably formed of a resilient material, including resinous and polymer materials such as and without limitation an elastomeric material, neoprene, synthetic foam rubber or the like. The strand 40 rides directly on the soft O-ring 58 at all times rather than within the pulley race. In use, the lever 56 in the locked position applies a compressive force which sets up equal and opposing shear strains in the lever and pulley pivot-pins 64 and 62. Since each of the lever 56, the pulley 54 and the monofilament 40 are virtually incompressible, it is thus the soft O-ring 58 which in the clamping arrangement 56/40/58/54 as shown resiliently deforms under the compressive force induced by the over-center locking lever 56. Hence the soft O-ring 58 is advantageous because it resiliently absorbs the locking compressive force and therefore saves the monofilament strand 40 from damage. Also, it is an asset if the soft O-ring 58 is fabricated from a material like an elastomeric material o neoprene because elastomeric materials and neoprene and like materials provide increased frictional gripping on monofilament for better retention of the strand 40 and better elimination of creeping.

FIG. 4 includes a pair of opposed reference arrows 74 that indicate the compression on the soft O-ring 58 as induced by the locked lever 56. In FIG. 3, the reference arrow 76 indicates the direction which the strand 40 is prevented from movement by the locked lever 56. If the strand 40 is pulled in the opposite direction then that tends to unlock the lever 56. In FIG. 4, the soft O-ring 58 is shown (vis-a-via a cross-sectional format) in a compressed or flattened state between the strand 40 and pulley 54's surface.

FIGS. 5 and 6 show an alternate version $20^5$ of the block and lock arrangement in accordance with the invention. In the FIGS. 5 and 6 version $20^5$, there is neither a pulley 54 nor an O-ring 58, which have been omitted and replaced by a roller 78. The roller 78 has a hard core on which is mounted a resilient resinous or polymer material such as and without limitation an elastomeric material or neoprene, but preferably of a relatively harder elastomeric or neoprene stock than that used in the O-ring 58. FIG. 6 shows the roller 78's surface depressed by the strand 40 when it is smashed into the roller 78 by the locked lever 56'. Accordingly, it is the roller 78 in this clamping arrangement 56'/40/78 which resiliently yields, rather than the lever 56' or strand 40 which are far more incompressible. Also, if the roller 78 is fabricated from a material like an elastomeric material or neoprene or other suitable polymer or resinous material, the roller 78 further provides improved frictional gripping between itself and the monofilament strand 40. To improve the frictional gripping between the strand 40 and roller 78 (or O-ring 58), the roller surface may be given some sort of texture ranging in simplicity between simple roughness to a chevron pattern or the like (not shown).

Whereas the roller 78 as disclosed as a composite having a hard core covered by a soft outer layer, the roller 78 could be constructed otherwise in accordance with the invention such as for example—and without limitation—a solid disk of the soft material.

FIGS. 7 and 8 disclose an additional version $20^7$ of a block and lock arrangement in accordance with the invention. The block $20^7$ comprises a comparable casing as was shown by FIGS. 5 and 6 (e.g., incorporating a soft roller 78), except elongated to accommodate the locking mechanism 80 shown by FIGS. 7 and 8. Whereas the block $20^7$ of FIGS. 7 and 8 is shown with a soft roller 78, it is shown that way for illustrative purposes only and the inventive locking mechanism 80 is not excluded from configuration with a pulley and O-ring arrangement 54/58 or otherwise. The locking mechanism 80 comprises a slide 82 and a lever-actuator 84 to drive the slide 82 between locked (i.e., as shown by FIG. 7) and unlocked (i.e., shown by FIG. 8) extremes. The slide 82 is allowed translational movement in a slot 85 for it, as shown. The lever-actuator 84 includes a cam surface 86 for driving the slide 82 down. The lever actuator 84 holds its locking position as shown by FIG. 7, by an over-center arrangement between its pivot axis 64 and the roller pivot axis 62. The locking mechanism 80 as a whole preferably includes a leaf spring 87 which holds the slide 82 in contact with the cam surface 86 during retraction strokes (indicated by reference arrows 88 and 89 in FIG. 8). That is, whereas FIG. 7 shows the spring 87 in a given state of flexion, FIG. 8 shows the spring 87 in a given state of relative relaxation and contraction. The natural contraction of the spring 87 in its relaxed state tends to act on the slide 82 such that, when the lever 84 is actuated counterclockwise as indicated by arrow 88, the spring 87 tends to pull the slide 82 up as indicated by direction arrow 89, in perpetual abutment against the cam surface 86.

The FIGS. 7 and 8 version 20$^7$ of the block and locking arrangement provides the following advantages. The slide 82 has reversible extension and retraction strokes along a direction that is normal to the curvature of the strand 40 where the slide 82 jams into the strand 40. Hence the locked slide 82 clamps down against the strand 40 such that the strand 40 is prevented from movement equally well in either the clockwise or counterclockwise directions. This is unlike the versions 20$^3$ or 20$^5$ shown by FIGS. 3 through 6 which operate better at locking the strand 40 from movement in only one of either the clockwise or counterclockwise directions. Other aspects of the FIGS. 7 and 8 version 20$^7$ of the block are comparable to what has been previously disclosed. The neoprene (or other suitable resilient or elastomeric material) roller 78 resiliently yields as the strand 40 is impressed into it by the locked slide 82, which effectively clamps the strand 40 at the same time as saving it from damage. Also, the neoprene (or the like) roller 78 provides good frictional gripping on the strand 40 to hold it better and to better eliminate creeping in either the clockwise or counterclockwise directions.

FIGS. 9 through 12 show further embellishments 20$^9$, 20$^{10}$, 20$^{11}$ and 20$^{12}$ to the block and lock arrangement in accordance with the invention. In FIG. 9, the locking lever 57 is provided with a soft brake pad 90 for use in combination with a hard pulley 54:—e.g, the soft brake pad 90 obviates the need for the soft O-ring 58 as was shown in FIGS. 3 and 4 (although O-ring 58 could still be incorporated in the FIG. 9 block 20$^9$ arrangement). The material for the soft brake pad 90 can be chosen from any suitable resinous or polymer material including without limitation elastomeric materials or neoprene or the like.

FIG. 10 shows a slide arrangement 92 somewhat as was comparably shown by FIGS. 7 and 8 except that the FIG. 10 slide arrangement 92 is actuated by a screw 94 and it has a contoured soft (e.g., neoprene or so on) brake pad 96 for clamping down on the strand 40 against a hard roller 78'. The contour shaping is optional. The brake pad could be flat, rounded or otherwise cam-shaped and so on. Using the screw 94 as the actuator allows adjusting the amount of clamping pressure on the strand 40 for a controllable slippage or drag.

FIG. 11 shows a block and roller arrangement 20$^{11}$ comparable to the block and roller arrangement 20$^5$ shown by FIGS. 5 and 6, except that the casing 98 is adapted to hold three rollers 78 in a side by side arrangement between four fingers 98'. In FIG. 12, the block and roller arrangement 20$^{12}$ has a soft roller 79 mounted fixed on a hard core 63 that rolls on the main pivot pin 62. The inventive hard core 63 has a lobe for binding or compressing the soft material of the roller 79 between its lobe and the stem of the lever 57' in contact with the strand 40, as shown. The lobed-core 63 promotes tighter jamming and hence better gripping of the strand 40 by the soft material 79 to better prevent creeping or slip in the direction indicated by arrow 76.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A pulley- or roller-type block having a clamp arrangement for the line that transits the block, comprising:

a casing;

a rolling unit coupled to the casing for clockwise and counterclockwise rolling and having a circumferential ring portion including a line-bearing surface, whereby the rolling unit generally rolls clockwise or counterclockwise in response to alternate-direction transit of the line;

a clamping mechanism mounted to the casing and having a line-contacting portion operative between clamping and released extremes and an operator for operating the line-contacting portion;

wherein, because of the risk of forming a permanent weak spot in the line under highly concentrated clamping contact, at least one of at least portions of the circumferential ring portion of the rolling unit, including the line-bearing surface thereof, and the line-contacting portion of the clamping mechanism is formed from a resilient material, whereby the clamping contact on the line as squeezed between the rolling unit and clamping mechanism is distributed over a wider contact area by flexion of the resilient material, for both eliminating formation of weak spots in the line as well as enhancing frictional grabbing to eliminate slip of the clamped line.

2. The pulley- or roller-type block of claim 1 wherein the rolling unit and its circumferential ring portion comprise a rigid roller and a band of resilient material stretched around the circumferential surface of the rigid roller.

3. The pulley- or roller-type block of claim 1 wherein the rolling unit and its circumferential ring portion comprise a rigid pulley and an resilient-material O-ring stretched around and nested in the pulley race.

4. The pulley- or roller-type block of claim 1 wherein the rolling unit and its circumferential ring portion comprise a resilient-material roller.

5. The pulley- or roller-type block of claim 1 wherein the rolling unit and its circumferential ring portion comprise a composite of at least an eccentric rigid core and a resilient-material cover around the rigid core, which resilient-material cover when un-flexed generally defines a non-eccentric line-bearing surface.

6. The pulley- or roller-type block of claim 1 wherein the line-contacting portion of the clamping mechanism comprises a resilient-material brake pad.

7. The pulley- or roller-type block and clamp arrangement of claim 1 wherein the line comprises one of strands, cables, wires, ropes, cords, monofilament lines, braided lines, and coaxial-filament lines.

8. The pulley- or roller-type block of claim 1 wherein the clamping arrangement is arranged such that the line-contacting portion reciprocates into and away from the rolling unit for moving between the clamping and released extreme positions thereof, respectively.

9. The pulley- or roller-type block of claim 1 wherein the clamping arrangement is arranged such that the line-contacting portion is formed at the end of an over-center jam which is mounted for pivotally moving the line-contacting portion between the clamping and released extreme positions thereof, respectively.

10. The pulley- or roller-type block of claim 9 wherein the over-center jam is biased away from the clamping position so that the line-contacting portion may provide clearance for transit of the line transit non-use of the clamping arrangement.

11. The pulley- or roller-type block of claim 9 wherein the line-contacting portion of the over-center jam is given a cam shape that helps preventing the jam while not in the clamping position and free to flap about, from errantly biting into the line during transit thereof, which thereby helps eliminate the jam from self-latching itself in the clamping position therefor.

12. An angler's outrigger arrangement for use on a boat comprising:

a spar extending from a base to a tip, the base being mounted to the boat;

a fishline-holding and -releasing device for transiting reversibly between a near and far position, the far position being proximate the spar tip as the near position is more generally situated to allow a passenger of the boat to reach and manipulate said fishline device;

a strand for carrying and conveying the fishline device between said near and far positions thereof;

idler means, secured to the spar proximate the tip and coupled to the strand, for idly allowing reversible transit of the strand past said idler means at a location associated with the far position for the fishline device;

a pulley- or roller-type block with a lock arrangement, which is secured to the boat at a location associated with the near position for the fishline device;

wherein said pulley- or roller-type block with lock arrangement comprises:

casing;

a rolling unit coupled to the casing for clockwise and counterclockwise rolling and having a circumferential ring portion including a strand-bearing surface whereby, with the strand transiting at least partially around the rolling unit, the rolling unit generally can roll clockwise or counterclockwise in response to alternate-direction transit of the strand;

the lock arrangement having a strand-contacting portion operative between locking and unlocked extremes and an operator for operating the strand-contacting portion;

wherein, because of the risk of forming a permanent weak spot in the strand under highly concentrated locking contact, at least one of at least portions of the circumferential ring portion of the rolling unit, including the strand-bearing surface thereof, and the strand-contacting portion of the locking arrangement is formed from a resilient material, whereby the compressive force on the strand as squeezed between the rolling unit and lock arrangement is distributed over a wider contact area by flexion of the resilient material, for both eliminating formation of weak spots in the strand as well as enhancing frictional grabbing to eliminate slip of the locked strand.

13. The outrigger arrangement of claim 12 wherein the strand is extended in a circuit such that the fishline device is disposed at some point in such circuit.

14. The outrigger arrangement of claim 12 wherein the rolling unit and its circumferential ring portion comprise a rigid roller and a resilient-material band stretched around the circumferential surface of the rigid roller.

15. The outrigger arrangement of claim 12 wherein the rolling unit and its circumferential ring portion comprise a rigid pulley and a resilient-material O-ring stretched around and nested in the pulley race.

16. The outrigger arrangement of claim 12 wherein the rolling unit and its circumferential ring portion comprise a resilient-material roller.

17. The outrigger arrangement of claim 12 wherein the rolling unit and its circumferential ring portion comprise a composite of at least an eccentric rigid core and a resilient-material cover around the rigid core, which resilient-material cover when un-flexed generally defines a non-eccentric strand-bearing surface.

18. The outrigger arrangement of claim 12 wherein the strand-contacting portion of the locking arrangement comprises a resilient-material brake pad.

19. The outrigger arrangement of claim 12 wherein the strand comprises one of cables, wires, ropes, cords, monofilament lines, braided lines, and coaxial-filament lines.

20. The outrigger arrangement of claim 12 wherein the lock arrangement is arranged such that the line-contacting portion reciprocates into and away from the rolling unit for moving between the locking and unlocked extreme positions thereof, respectively.

21. The outrigger arrangement of claim 12 wherein the lock arrangement is arranged such that the line-contacting portion is formed at the end of an over-center jam which is mounted for pivotally moving the line-contacting portion between the locking and unlocked extreme positions thereof, respectively.

22. The outrigger arrangement of claim 21 wherein the over-center jam is biased away from the locking position so that the line-contacting portion may provide clearance for the strand's transit during non-use of the lock arrangement.

23. The outrigger arrangement of claim 21 wherein the line-contacting portion of the over-center jam is given a cam shape that helps preventing the jam while not in the clamping position and free to flap about, from errantly biting into the line during transit thereof, which thereby helps eliminate the jam from self-latching itself in the locking position therefor.

24. The outrigger arrangement of claim 12 wherein the idler means comprises one of an idler roller or idler pulley.

* * * * *